United States Patent [19]

Cornwell

[11] Patent Number: 5,785,014
[45] Date of Patent: Jul. 28, 1998

[54] EXPANSION CHAMBER FOR TWO-CYCLE ENGINE

[76] Inventor: Gary R. Cornwell, 399445 E. River Ct., Clinton Township, Macomb County, Mich. 48038

[21] Appl. No.: 736,386

[22] Filed: Oct. 24, 1996

Related U.S. Application Data

[60] Provisional application No. 60/009,158, Dec. 22, 1995.

[51] Int. Cl.⁶ ............................................. F01N 3/00
[52] U.S. Cl. ........................ 123/65 PE; 123/65 EM; 60/314; 60/324
[58] Field of Search ...................... 123/65 EM, 65 R, 123/65 PE; 60/324, 312, 314

[56] References Cited

U.S. PATENT DOCUMENTS 1,818,796  8/1931  Feyens ........................... 123/65 PE
2,983,911  5/1961  Brafford ............................ 340/264
3,254,483  6/1966  Martin et al. ....................... 60/312
3,665,712  5/1972  Tenney ......................... 123/65 EM
3,969,895  7/1976  Krizman ............................ 60/312
4,669,585  6/1987  Harris .............................. 188/173
4,714,056  12/1987  Tottori et al. .................. 123/65 PE
4,903,486  2/1990  Finkle ............................... 60/324
4,909,034  3/1990  Kakuta .............................. 60/324
5,579,638  12/1996  Archer ............................. 60/314

*Primary Examiner*—David A. Okonsky
*Attorney, Agent, or Firm*—Howard & Howard

[57] ABSTRACT

Expansion chambers for two-cycle engines include a moveable closure piston which selectively increases the flow cross-sectional area geometrically upon increasing back pressure. The improved expansion chamber thus results in better regulation of the back pressure in the two-cycle engine. Several expansion chamber embodiments are disclosed.

20 Claims, 3 Drawing Sheets

EXPANSION CHAMBER FOR TWO-CYCLE ENGINE

BACKGROUND OF THE INVENTION

This application claims priority of provisional application Ser. No. 60/009,158 filed Dec. 22, 1995.

This Application discloses an expansion chamber that provides a variable flow area on the outlet of a two-cycle engine to control the back pressure in the exhaust chamber.

Two-cycle engines have two piston members operating 180° out of phase. The pistons themselves typically open and close the inlet and outlet ports to the engine cylinders. When the inlet is open, a fuel charge is allowed to move into the combustion chamber at about the same time the previously combusted air and gas is leaving the chamber.

Because of this valve timing, a portion of the new fuel charge may sometimes escape along with the combusted gas. This reduces power and fuel economy. To address this problem, the prior art has traditionally used a so-called tuned pipe, or expansion chamber to create a back pressure at the exhaust chamber. In these prior art systems, the flow cross-sectional area increases along a direction of flow. These systems perform well at a predetermined rpm, however, they are long and they do not dampen noise very successfully. Moreover, engines operate at varying RPMs, and thus it would be desirable to have a system which is not dependent upon on engine operation at any one speed.

The prior art has also proposed spring bias members which close off the outlet, and in which the exhaust pressure overcomes the spring force to open a flow path. These proposed devices would not be fully satisfactory, as they do not provide variable expansion of the flow area.

SUMMARY OF THE INVENTION

In a disclosed embodiment of this invention, a spring-biased closure member is biased towards a position closing the path through on an expansion chamber for a two-cycle engine. Upon a buildup of back pressure on a face of the closure member facing the outlet of the two-cycle engine, the closure member overcomes its spring bias, and begins to open up a flow path. In preferred embodiments of this invention, the flow cross-sectional area increases non-linearly, and preferably geometrically, as the pressure increases. The non-linear expansion of the flow cross-section allows the back pressure to be finely tuned and self-regulating for the particular engine RPM and operating conditions.

The inventive expansion chambers increase the torque output throughout the RPM range of the engine over the prior art. This increased torque is a valuable benefit.

In embodiments of this invention, a housing member includes a plurality of slots. A closure member moves relative to the housing, and away from an original position. As the closure member moves additional slots are open, thus increasing the flow cross-sectional area by a non-linear, and preferably geometric amount. In alternatives to the slots, holes may be utilized.

In one application, a fixed central rod may include openings, such as slots or holes, and the closure member is moveable outwardly, and along the rod. Upon buildup of back pressure, the closure member moves along the rod opening more and more openings to increase the flow cross-sectional area. The exhaust air is able to move into the openings and through the rod to exhaust. The back pressure variation achieved by this system provides maximized noise reduction and also reliable self-regulation of the exhaust. In other embodiments of this invention, the closure member is moveable within an outer housing to expose the slots or holes.

The embodiments with openings could be generally described as having increasing cross-sectional area for discrete segments of length along a direction of movement.

In further embodiments, the closure member may move along a ramped central core member. The flow cross-sectional area is defined by the distance between the ramped central core member and the inner periphery of the closure member. As the closure member moves, the flow volume increases. In one other embodiment, the closure member rotates with movement of a closure plate to open more and more holes.

In other features of this invention, the spring force may be adjusted to provide better control over the position of the closure members and the resistance to the exhaust pressure. Finally, additional noise reduction systems may be incorporated downstream of the inventive expansion chamber when necessary.

These and other features of the present invention can be best understood from the following specification and drawings, of which the following is a brief description.

DETAILED DESCRIPTION OF A PREFERRED EMBODIMENT

Figure 1:
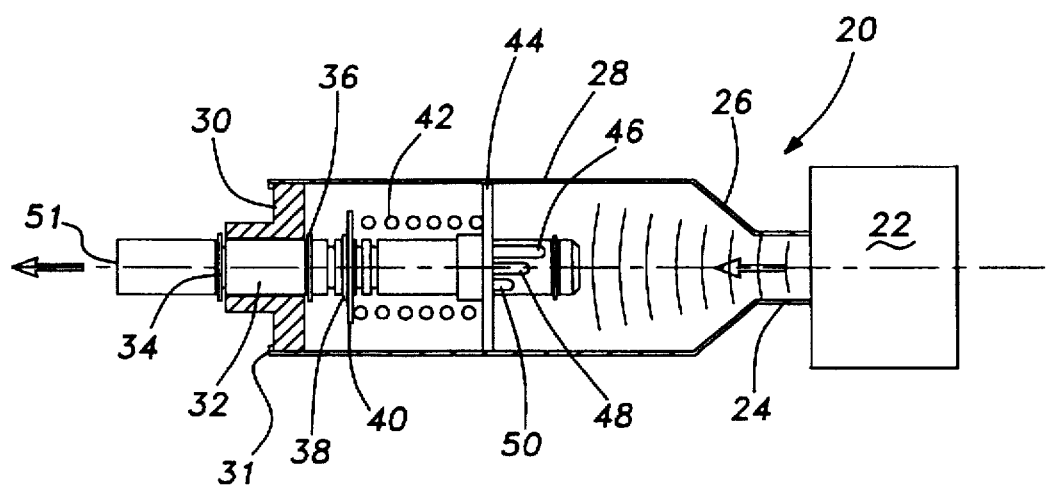
FIG. 1 is a cross-sectional view through a first embodiment of the present invention.

FIG. 1 shows an inventive expansion chamber 20 positioned on the exhaust of a two-cycle engine 22. As known, such two cycle engines are used in many applications. Examples include hobby vehicles, such as airplanes, boats, helicopters, and cars. Other common applications are snowmobiles, motorcycles, jet skis and boats.

Inlet 24 to the expansion chamber 20 is relatively small, and communicates with the outlet of the two-cycle engine 22. An outwardly necked portion 26 leads to the nominal cylindrical portion 28 of the expansion chamber 20. An end cap 30 is positioned at the end of cylindrical portion 28. As shown, a clip 31 may hold the end cap 30 at that location. A central rod 32 is fixed within end cap 30, and snap ring 34 holds end cap 30 on the rod 32. Rod 32 is hollow, as will be explained below. Another snap ring 36 holds the rod 32 on the opposed end of end cap 30. Yet another snap ring 38 provides a stop position for an adjustment washer 40. A spring 42 uses adjustment washer 40 as an abutment, and biases a closure piston 44 away from abutment 40. As shown, central rod 32 has a plurality of slots 46, 48, and 50. Slot 46 extends further forwardly than does slot 48, which itself extends further forwardly than slot 50. As should be appreciated from this embodiment, as the pressure moving into the expansion chamber 20 increases, the closure piston 44 will move further to the left uncovering more and more slots. Initially, only slot 46 is open. As the closure 44 moves further to the left, however, slot 46 is opened, and after a period of additional movement, slot 48 is opened. Thus, the flow cross-sectional area increases, non-linearly, and effectively geometrically. In this way, the system is able to quickly and accurately reach a position to provide optimum back pressure at any one moment.

Figure 2:
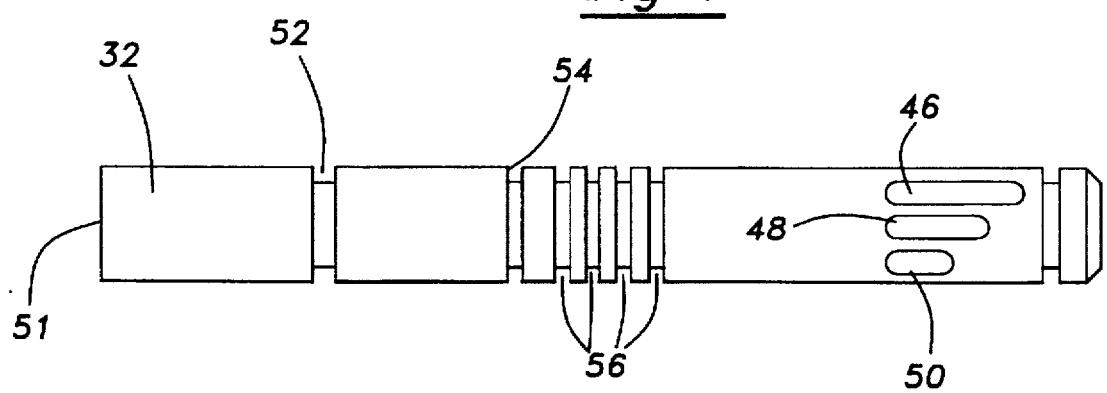
FIG. 2 shows a central core member incorporated into the first embodiment.

FIG. 2 shows rod 32 including snap ring grooves 52, 54 and 56. The rod 32 is hollow, and the gas which enters the chamber 20 may move into the slots, along the length of rod 32 and to an outlet 51.

To adjust the tension of the spring 42, the plurality of snap ring grooves 56 are utilized. An assembler selects one of the slots to receive the snap ring 36 which provides for washer 40. By moving snap ring 36 further to the right, one increases the spring tension in spring 42, thus requiring greater pressure to move the closure piston 44 to the left and uncover the slots.

Figure 3:
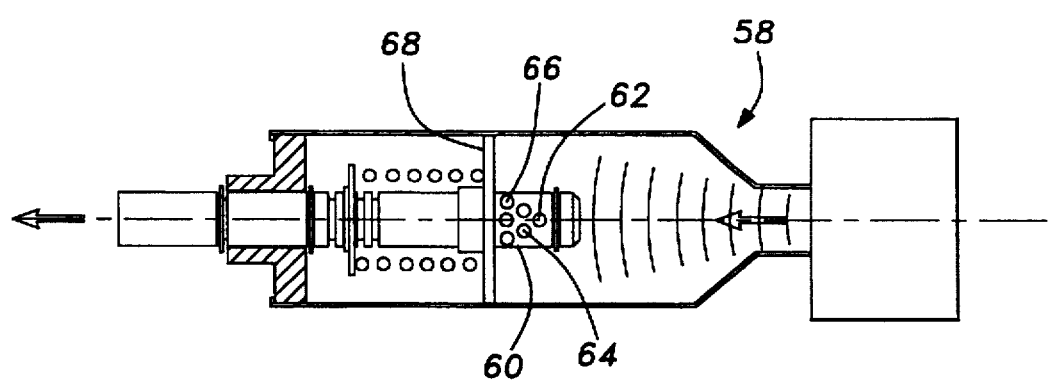
FIG. 3 shows a second embodiment of the invention.

FIG. 3 shows an alternative embodiment expansion chamber 58. In FIG. 3, rod 60 has a plurality of holes 62, 64, 66, rather than the slots. As can be appreciated, when the closure piston 68 moves to the left, it first unopens the single hole 62. Upon further movement, the double holes 64 are opened and then the triple holes 66. Thus, again, the flow cross-sectional area allowing flow into rod 60 and to the exhaust, increases non-linearly with movement of the closure piston 68.

As the back pressure increases in the embodiments shown in FIGS. 1, 2 or 3, the closure pistons move to the left. As this occurs, the flow cross-sectional area will be increasing geometrically. This can be visualized easily by considering FIG. 3. As the closure piston initially opens the hole 62, only a single cross-sectional area unit is available. As the closure piston continues to move to the left, and opens the dual holes 64, there will now be three units of cross-sectional area, and as the holes 66 open there will be six units. Thus, the flow cross-sectional area is increasing geometrically rather than linearly. The slot embodiment shown in FIGS. 1 and 2 would have a similar increase. The back pressure is thus able to self-regulate itself much more accurately, quickly and quietly then would be the case with the linear expansion. This also provides better torque output across the RPM range.

Figure 4:
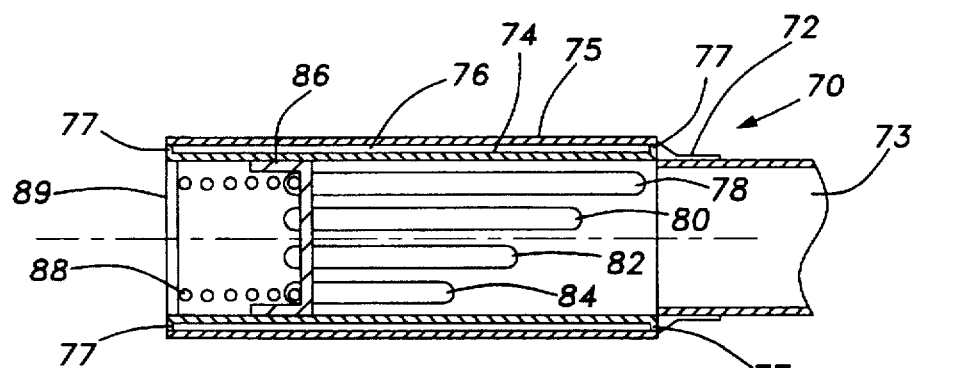
FIG. 4 shows a third embodiment of the present invention.

As shown in FIG. 4, another embodiment 70 includes a neck 72 to be secured to the exhaust pipe 73. An inner wall member 74 is secured within an outer tubular wall member 75. A space 76 is defined between the tubular members 74 and 75. A plurality of spaced pins 77 extend outwardly from the inner member 74 and lock the inner member 74 within the outer member 75 with a force fit. Slots 78, 80, 82 and 84 are formed within the inner member 74. The closure piston 86 is spring biased 88 away from an end wall 89. Piston 86 is moved to the left upon increasing back pressure, and the slots increase the flow cross-sectional area non-linearly as in the previous embodiment.

Figure 5:
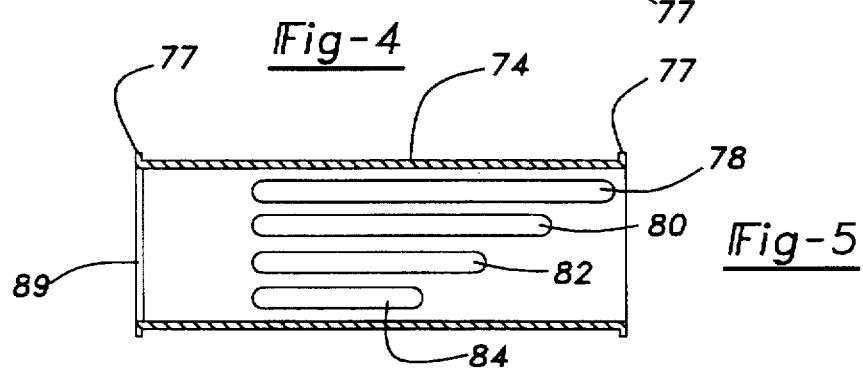
FIG. 5 shows a central portion of the FIG. 4 embodiment.

FIG. 5 shows the inner wall member 75 having pins 77 which are circumferentially spaced to lock the inner member 74 by a force fit within the outer member 75.

Figure 6A:
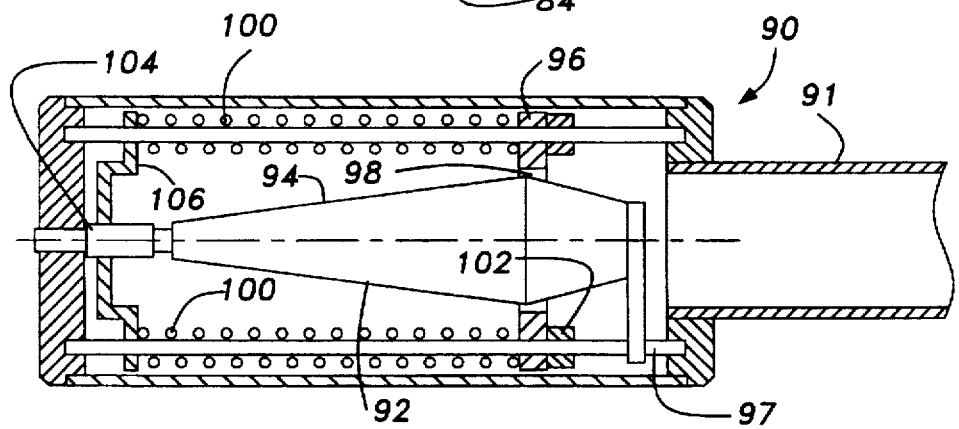
FIG. 6A shows a fourth embodiment in a first position.

FIG. 6a shows yet another embodiment 90 with a central solid pin 92 having a frusto-conical ramped outer surface 94. The closure piston 96 is spaced from the outer surface 94 to define a flow cross-sectional area 98. The closure piston 96 is preferably cylindrical and moves on a plurality of pins 97. Springs 100 bias the closure piston 96 against a stop 102.

A threaded end portion 104 of the central pin 92 may be turned to advance an abutment piston 106 to adjust the tension in the spring 100.

Figure 6B:
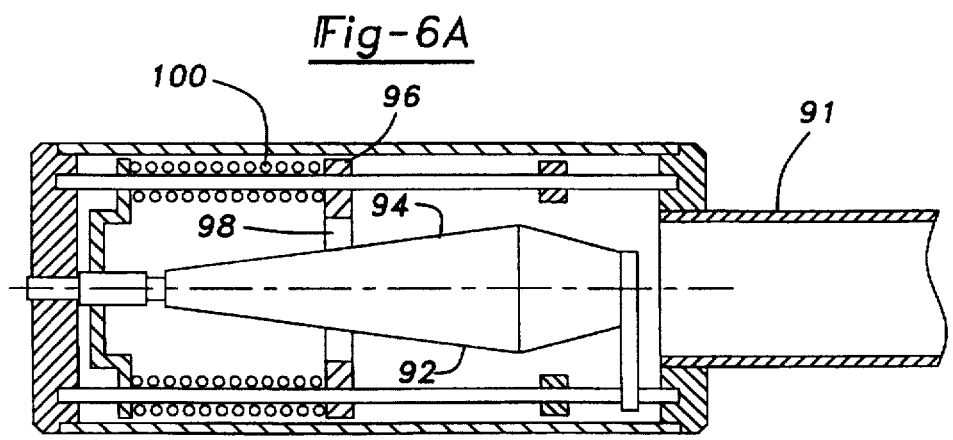
FIG. 6B shows the fourth embodiment after the application of back pressure.

As shown in FIG. 6b, when back pressure increases from the port 91, the closure piston 96 moves to the left. The flow cross-sectional area 98 increases due to the distance between the piston 96 and the surface 94. This increase may be linear or non-linear depending on the surface configurations. Preferably, the increase is non-linear.

Figure 7A:
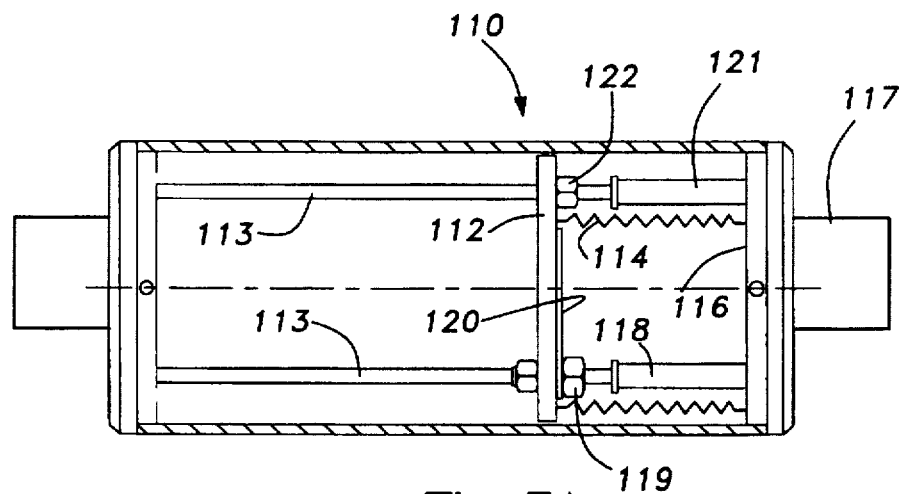
FIG. 7A shows a fifth embodiment.

FIG. 7a shows yet another embodiment 110, having a closure piston 112 biased by spring 114 towards an end wall 116 associated with the exhaust 117. A screw rod 118 mounts a screw bushing 119, and is fixed to a pivoting valve plate 120. A guide rod 121 mounts a guide bushing 122 within the piston 112.

Rods 113 mount the piston 112. As the pressure increases, the closure piston 112 moves to the left. During that movement, the screw bushing 119 will turn due to a threaded connection between the screw rod 118 and the bushing 119. The valve plate 120 turns with the bushing 119. The mechanical structure for achieving the turning movement may be as known in the art, and is well within the skill of a worker in the art. Preferably, a pin would move within a slot to achieve the turning.

Figure 7B:
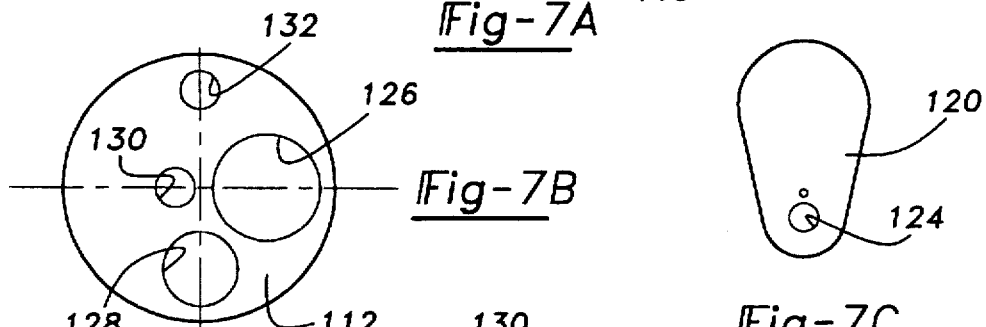
FIG. 7B shows one detail of the fifth embodiment.

As shown in FIG. 7b, the valve plate 120 includes an opening 124 such that it can be secured to the spring bushing 119.

Figure 7C:
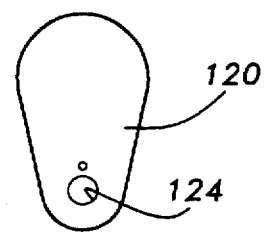
FIG. 7C shows another detail of the fifth embodiment.

FIG. 7c shows the abutment piston 112. An opening 132 receives the guide bushing 122. The opening 128 receives the screw bushing 119. The openings 126 and 130 are selectively opened as the valve plate 120 rotates due to movement. Thus, as the valve plate moves to the left, more and more of opening 126 is opened, thus increasing the flow cross-sectional area non-linearly.

Figure 8:
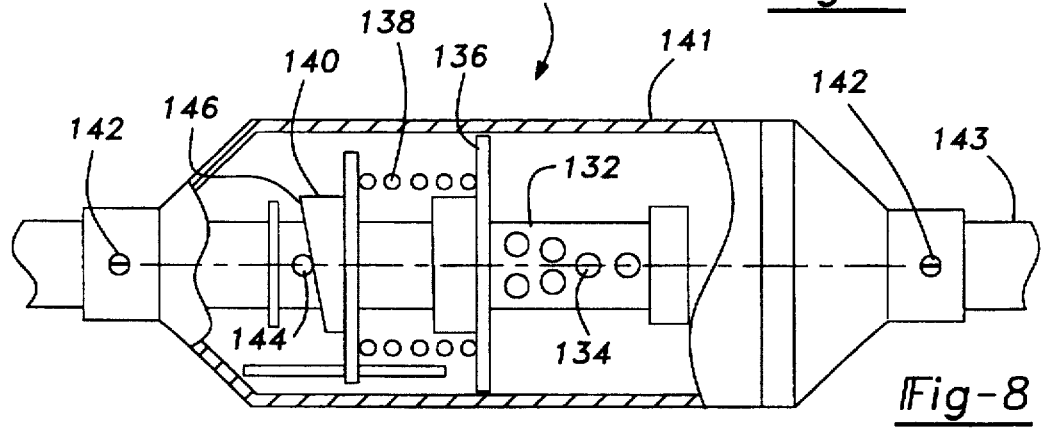
FIG. 8 shows an embodiment with adjustable force.

FIG. 8 shows a further embodiment for adjusting the spring force. In FIG. 8, an expansion chamber 130 is provided with a central rod 132 which includes holes 134. The closure piston 136 is biased by a spring 138 from an abutment plate 140. A plurality of set screws 142 lock the outer housing 141 on the central pin 132, and on the inlet 143. The set screws 142 allow the central pin to be rotated relative to the inner members. The abutment piston 140 abuts a roll pin 144 at a ramp surface 146. Abutment piston 140 may be moved to the left or right as shown in this Figure by turning the central pin 132, causing roll pin 144 to cam the surface 146 and move the abutment piston 140. Once central pin 130 is turned a desired amount, set screws 142 are then retightened. In this way, the spring force can be adjusted.

Figure 9:
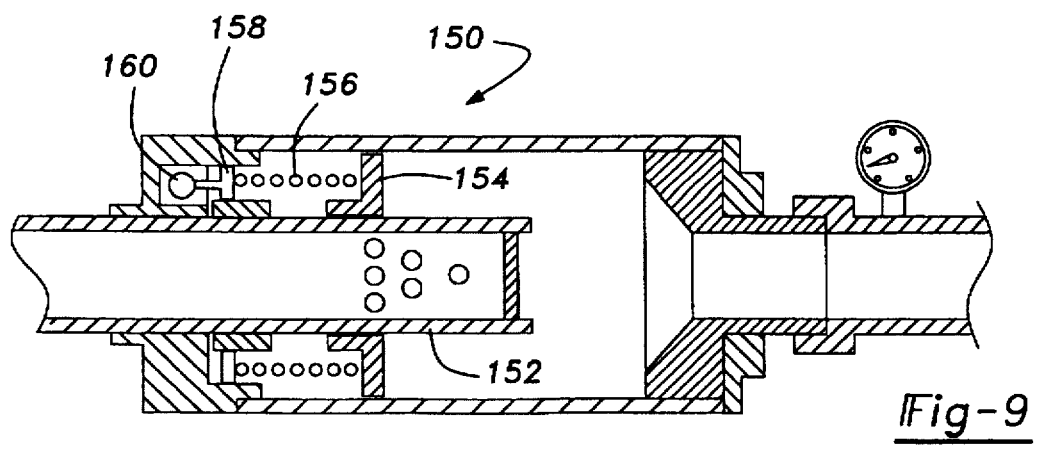
FIG. 9 shows another adjustable embodiment.

FIG. 9 shows another adjustable expansion chamber embodiment 150 having a hollow central pin 152 with holes 153. The closure piston 154 is spring biased by spring 156 which abuts an abutment 158. An eccentric screw mount 160 may be turned to move the closure piston to the right or left as shown in this Figure to again adjust the spring force in spring 156.

Several preferred embodiments of this invention have been disclosed, however, a worker of ordinary skill in the art would recognize that certain modifications would come within the scope of this invention. For that reason, the following claims should be studied to determine the true scope and content of this invention.

I claim:

1. An expansion chamber for a two-cycle engine comprising:
   a chamber to be communicated to the exhaust of a two-cycle engine;
   a closure piston moveable within said chamber, said closure piston being biased towards a closed position, increasing back pressure in said chamber moving said piston against said bias force and away from said closed position toward an open position; and
   a flow cross-sectional area through said chamber increasing non-linearly as said piston moves towards said open position, said closure piston moving relative to a second member which includes a plurality of openings, the cross-sectional area of said openings in second member increasing for discrete segments of length of said second member along a direction of movement of said closure piston.

2. An expansion chamber as recited in claim 1, wherein an inlet to said expansion chamber leads to a neck portion which expands outwardly to increase flow cross-sectional area before encountering said closure piston.

3. An expansion chamber as recited in claim 1, wherein said second member is a hollow central rod fixed within said expansion chamber of said central rod, and said piston being slidable along said central rod, said openings being in an outer peripheral surface of said central rod at locations closed by said piston, when said closure piston is in said closed position, and the flow cross-sectional area increasing as said piston moves toward said open position.

4. An expansion chamber as recited in claim 3, wherein said openings in said central rod are slots, with some of said slots extending further away from said open position than others of said slots such that as said closure piston moves towards said open position, additional ones of said slots are opened to flow.

5. An expansion chamber as recited in claim 3, wherein said openings in said central rod are holes, with additional ones of said holes being opened by said piston moves toward said open position.

6. An expansion chamber as recited in claim 1, wherein said closure piston is moveable within an inner periphery of a hollow body, said hollow body being said second member and including said plurality of openings leading into a plenum, said closure piston selectively blocking flow from said exhaust to said plenum through at least some of said openings in said closed position, and said closure piston being moveable toward said open position to open additional ones of said openings as the pressure in said expansion chamber increases.

7. An expansion chamber as recited in claim 6, wherein said openings are slots, with some of said slots extending further away from said open position than others of said slots such that as said piston moves towards said open position, additional ones of said slots are opened to flow.

8. An expansion chamber as recited in claim 6, wherein said openings are holes, with additional ones of said holes being opened as said piston moves toward said open position.

9. An expansion chamber as recited in claim 1, wherein the force of said bias force is adjustable.

10. An expansion chamber for a two-cycle engine comprising
    a chamber to be communicated to the exhaust of a two-cycle engine;
    a closure piston moveable within said chamber, said closure piston being biased towards a closed position, increasing back pressure in said chamber moving said piston against said bias force and away from said closed position towards an open position;
    a flow cross-sectional area through said chamber increasing non-linearly as said piston moves towards said open position; and
    said closure piston rotating a cover member as it moves toward said open position, said cover member uncovering openings through said closure piston to provide said increase in cross-sectional area.

11. An expansion chamber for a two-cycle engine comprising:
    a chamber to be communicated to the exhaust of a two-cycle engine;
    a closure piston moveable within said chamber, said closure piston being biased towards a closed position, increasing back pressure in said chamber moving said piston against said bias force and away from said closed position towards an open position;
    a flow cross-sectional areas through said chamber increasing non-linearly as said piston moves towards said open position; and
    said closure piston is moveable outwardly of a frusto-conical central core, said flow cross-sectional area being defined between an inner periphery of a bore in said closure piston and the outer periphery of said frusto-conical rod, and said flow cross-sectional area increasing as said closure piston moves towards said open position.

12. A two-cycle engine comprising:
    a two-cycle engine having an exhaust;
    an expansion chamber mounted to said exhaust, said expansion chamber including a closure piston moveable within said chamber, said closure piston being biased towards a closed position, increasing back pressure in said chamber moving said piston against said bias force and away from said closed position towards an open position; and
    a flow cross-sectional area through said chamber increasing non-linearly as said piston moves towards said open position, said closure piston moving relative to a second member which includes a plurality of openings, the cross sectional area of said openings in said second member increasing for discrete segments of length of said second member along a direction of movement of said closure piston.

13. A two-cycle engine as recited in claim 12, wherein said second member is a hollow central rod fixed within said expansion chamber, said piston being slidable along said central rod, said openings being in an outer peripheral surface of said central rod at locations closed by said piston when said closure piston is in said closed position, and the flow cross-sectional area increasing as said piston moves toward said open position.

14. A two-cycle engine as recited in claim 12, wherein said closure piston is moveable within an inner periphery of a hollow body, said hollow body being said second member and including said plurality of openings leading into a plenum, said closure piston selectively blocking flow from said exhaust to said plenum through at least some of said openings in said closed position, and said closure piston being moveable toward said open position to open additional ones of said openings as the pressure in said expansion chamber increases.

15. A two-cycle engine as recited in claim 12, wherein the force of said bias force is adjustable.

16. A two-cycle engine comprising:

a two-cycle engine having an exhaust;

an expansion chamber mounted to said exhaust, said expansion chamber including a closure piston moveable within said chamber, said closure piston being biased towards a closed position, increasing back pressure in said chamber moving said piston against said bias force and away from said closed position towards an open position;

a flow cross-sectional area through said chamber increasing non-linearly as said piston moves towards said open position; and said closure piston rotates a cover member as it moves toward said open position, said cover member uncovering openings through said closure piston to provide said increase in cross-sectional area.

17. A two-cycle engine comprising:

a two-cycle engine having an exhaust, an expansion chamber mounted to said exhaust, said expansion chamber including a closure piston moveable within said chamber, said closure piston being biased towards a closed position, increasing back pressure in said chamber moving said piston against said bias force and away from said closed position towards an open position;

a flow cross-sectional area through said chamber increasing non-linearly as said piston moves towards said open position; and said closure piston is moveable outwardly of a frusto-conical central core, said flow cross-sectional area being defined between an inner periphery of a bore in said closure piston and the outer periphery of said frusto-conical rod, and said flow cross-sectional area increasing as said closure piston moves towards said open position.

18. An expansion chamber for use on a two-cycle engine comprising:

an inlet to an expansion chamber and adapted to be connected to the exhaust of a two-cycle engine, said inlet leading into a chamber;

a central rod fixed within said chamber, said central rod having a frusto-conical outer periphery; and a closure piston having a central bore received outwardly of said central rod, a flow cross-sectional area being defined between said central bore and said closure piston and said outer peripheral surface of said central rod, said frusto-conical surface of said central rod decreasing in a first direction, and said closure piston being spring biased in a second direction opposed to said first direction.

19. An expansion chamber as recited in claim 18, wherein said spring bias force is supplied by coil springs moveable on rods, said rods guiding movement of said closure piston.

20. An expansion chamber as recited in claim 18, wherein said flow cross-sectional area increases non-linearly as said closure piston moves in said first direction.

* * * * *